United States Patent [19]
Sahli et al.

[11] Patent Number: 5,484,667
[45] Date of Patent: Jan. 16, 1996

[54] SPACERS FOR LEAD-ACID BATTERIES

[75] Inventors: Richard M. Sahli, Cottage Grove; Deborah S. Baumgartner, Prior Lake, both of Minn.

[73] Assignee: GNB Battery Technologies Inc., Mendota Heights, Minn.

[21] Appl. No.: 116,879

[22] Filed: Sep. 7, 1993

[51] Int. Cl.$^6$ .............................. H01M 2/10; B60R 16/04
[52] U.S. Cl. ........................ 429/100; 429/176; 429/178; 429/186; 180/68.5; 248/503
[58] Field of Search ...................... 429/178, 100, 429/96, 176, 186; 248/503; 180/68.5

[56] References Cited

U.S. PATENT DOCUMENTS

| | | |
|---|---|---|
| 1,430,741 | 10/1922 | Keller . |
| 2,710,660 | 6/1955 | Coleman ............................ 248/503 X |
| 2,947,374 | 8/1960 | Moore ................................... 180/68.5 |
| 2,979,146 | 4/1961 | Fogle ..................................... 180/68.5 |
| 4,169,191 | 9/1979 | Alt et al. ........................... 180/68.5 X |
| 4,317,497 | 3/1982 | Alt et al. ............................. 248/503 X |
| 4,327,809 | 5/1982 | Fenstermaker ....................... 180/68.5 |
| 4,431,717 | 2/1984 | Kikuchi ................................... 429/100 |
| 4,508,794 | 4/1985 | Wright .................................... 429/100 |
| 4,515,233 | 5/1985 | Silverstein ............................. 180/68.5 |
| 4,529,053 | 7/1985 | Tucker .................................... 180/68.5 |
| 4,613,550 | 9/1986 | Jergl et al. ............................. 429/53 |
| 4,645,725 | 2/1987 | Kump et al. ............................ 429/179 |
| 4,682,751 | 7/1987 | Tamas .................................... 248/503 |
| 4,701,386 | 10/1987 | Kump et al. ............................ 429/179 |
| 4,752,543 | 6/1988 | Anderson et al. ..................... 429/179 |
| 4,754,827 | 7/1988 | Hirabayashi ........................... 180/68.5 |

Primary Examiner—John S. Maples
Attorney, Agent, or Firm—Leydig, Voit & Mayer

[57] ABSTRACT

A multi-functional spacer is provided for which comprises a body portion removably attachable to the bottom of the battery and one or more auxiliary spacer members removably attached to the body portion and, when detached from the body portion, the auxiliary spacer members being attachable to a side or end wall of the battery. The body portion defines a top surface adapted to receive the battery and a bottom surface adapted to be received by a battery mounting device. The distance between the top and bottom surfaces of the spacer body portion is coordinated such that when the body portion is attached to the battery, the combined height of the body portion and battery is generally equivalent to the height requirement of a battery mounting device for a first vehicle having a height requirement greater than the height of the battery itself. The width of the auxiliary spacer members is coordinated such that when one or more of the auxiliary spacer members are attached to a side or end wall of the battery, the combined width or length of the auxiliary spacer members and the battery is generally equivalent to, respectively, the width or length requirement of a battery mounting device for a second vehicle having a corresponding dimensional requirement greater than the dimension of the battery.

20 Claims, 3 Drawing Sheets

SPACERS FOR LEAD-ACID BATTERIES

FIELD OF THE INVENTION

This invention relates to spacers for lead-acid, starting, lighting, and ignition (SLI) electric storage batteries, and especially, to spacers and to batteries with which spacers may be used to selectively increase the effective height, width, and length of the battery and thereby to render the battery compatible with a wider variety of vehicle battery mounts.

BACKGROUND OF THE INVENTION

Lead-acid batteries are used in a wide variety of vehicles, such as trucks, cars, and the like. Such batteries typically are referred to as SLI (starting, lighting, and ignition) batteries. Although they may have various features, such as vents, terminals, handles, and the like, which project somewhat from the battery, lead-acid SLI batteries typically have a generally rectangular shape with a top, bottom, end, and side walls.

Such batteries necessarily must be mounted in a secure manner within the vehicle and connected to the vehicle's electrical system. The mounting devices typically include a relatively flat support surface, often referred to as a "tray", on which a battery may be placed. The battery then is secured to the tray by a variety of assemblies, usually referred to as a "hold-down". Examples of hold-downs include molded heat shields and bars, plates, L-shaped restraints, and various other devices which engage or abut the top or bottom of the battery.

The specific design of battery mounting devices and terminal connections, however, usually is determined by the vehicle manufacturer with specific battery dimensions in mind and with little or no concern over whether it will be compatible with batteries being used in similar vehicles. Thus, the specific configuration and dimensions of battery mounting devices vary a great deal from vehicle to vehicle, and likewise the external dimensions of batteries, for which battery mounting devices are designed, vary widely. Moreover, few, if any, battery mounts provided as original equipment in vehicles are adjustable to any appreciable degree so that variations in external dimensions of batteries may be accommodated.

The result of this approach to vehicle manufacturing is that a particular vehicle may accept only a limited number of battery types, and a battery manufacturer has to supply a large number of different battery types to fully supply the vehicle population. For example, automotive and light truck SLI batteries currently are classified by the Battery Council International into 93 different groups based on the terminal configuration and size of the battery, and when differences in electrical characteristics are factored in, battery manufacturers have to meet hundreds of different sets of battery requirements. The more common variations in the size of batteries involve their height, there being a high profile (approximately 8"), and a low profile (approximately 7¼"), and their width, there being a narrow (approximately 6½"), a standard width (approximately 7"), and a wide (approximately 7¼").

Over the more than 15 years or so that battery manufacturers have been faced with the seemingly ever-increasing proliferation of battery sizes, considerable attention has been directed to the problems associated with providing so many different sizes of batteries. This considerable effort has resulted in a wide variety of suggested solutions; some of which are still being used and many which were never commercialized or were commercialized but have fallen out of use.

For example, certain automobile aftermarket suppliers have developed hold-downs which are intended to be more compatible with different sizes of batteries. Examples of such attempts are disclosed in U.S. Pat. No. 4,515,233 to J. Silverstein, U.S. Pat. No. 2,979,146 to A. Fogle, and U.S. Pat. No. 2,947,374 to E. Moore.

Likewise, battery manufacturers have made various attempts to render a single battery more compatible with different vehicle mounts and connections. One approach that has achieved substantial commercial success is to provide the battery with what have been called dual-terminals, such as shown in U.S. Pat. Nos. 4,701,386 and 4,645,725 to W. Kump et al. Such dual-terminal batteries may be satisfactorily used regardless of whether the battery application requires top terminals or side terminals. This type of battery has stood the test of time and still is in widespread use, offering substantial appeal to mass merchandisers of SLI replacement batteries.

In an effort to achieve even greater standardization, battery manufacturers have provided smaller batteries with height and/or width spacers to make them compatible with mounting devices designed for larger batteries, e.g., to adapt a low profile battery to high profile battery mounting devices or a standard width battery to wide battery mounting devices.

One type of such spacers includes a generally H-shaped member which is designed to lie across the top of a battery. This type of top spacer, however, does not provide the battery with sufficient versatility. For example, such H-shaped spacers do not successfully adapt a low profile battery to a non-vertically adjustable high profile battery mounting device which includes molded heat shields.

Another general approach to compatabilizing the battery is to provide it with a bottom spacer which is attached to the bottom of the battery. Various types of such bottom spacers are known, such as the spacers disclosed in U.S. Pat. No. 4,613,550 to J. Jergl et al. Such spacers include height spacers, which increase the effective height of a battery, width spacers, which increase the effective width of a battery, and length spacers, which increase the effective length of a battery. Despite the advantages of spacers of this type, however, they still do not provide a battery with complete compatibility with the full range of battery mounts. For example, a height spacer would not facilitate the accommodation of a small battery into a battery mount designed for wider batteries, and vice versa.

Moreover, the manner in which spacers are to be used often is unclear to a consumer. It is not always easy or practical, however, to provide printed instructions on the battery or on packaging associated with the battery. The battery might not accommodate such instructions, or they may detract from the appearance of the battery.

Despite the considerable efforts over the last 15 years or so, however, there still exists a need for a system that can be readily adjustable to accommodate a single SLI battery in more of the many different types of vehicle battery mounts designed for wide variations in battery dimensions.

An object of this invention, therefore, is to provide a multi-functional spacer for a battery such that the battery is compatible with a wider range of battery mounting devices. A related and more specific object is to provide a single spacer which can render a smaller battery compatible with battery mounts designed to accommodate taller batteries and wider batteries.

Another object of this invention is to provide such spacers which can be easily and economically manufactured.

A further object is to provide means on a spacer by which instructions as to the use of the spacer may be communicated more readily to a user thereof.

Yet another object of the invention is to provide such spacers wherein all of the above-mentioned advantages are realized.

Those and other objects and advantages of the invention will be apparent to those skilled in the art upon reading the following detailed description and upon reference to the drawings.

SUMMARY OF THE INVENTION

The present invention comprises a system for providing, in effect, a universal battery by which the battery manufacturer is able to supply a battery user with a combination of (1) a battery having the necessary electrical performance required by a wide segment of the vehicle population and also having the minimal height, width, and length dimensions called for in that segment of the vehicle population, and (2) a multi-functional spacer by which, at the time of installing the battery in a particular vehicle, at least two of the three dimensions of the battery can be modified to fit the dimensional requirements of the vehicle's battery mount. For example, a dual spacer having the ability to increase the height and width dimensions of a battery will often be satisfactory because variations in the length requirements of battery mounts, to the extent that they occur, generally are less critical. However, the present invention can comprise a battery having certain predetermined minimum height, width, and length dimensions which is packaged with a multi-functional spacer by which a user can selectively increase one or more of the three dimensions to accommodate the height, width and length requirements of a particular mount in a particular vehicle.

In accordance therewith, the subject invention provides for a multi-functional spacer which comprises a body portion removably attachable to the bottom of the battery and one or more auxiliary spacer members removably attached to the body portion and, when detached from the body portion, the auxiliary spacer members being attachable to a side or end wall of the battery. The body portion defines a top surface adapted to receive the battery and a bottom surface adapted to be received by a battery mounting device. The distance between the top and bottom surfaces of the spacer body portion is coordinated such that when the body portion is attached to the battery, the combined height of the body portion and battery is generally equivalent to the height requirement of a battery mounting device for a first vehicle having a height requirement greater than the height of the battery itself.

The width of the auxiliary spacer members is coordinated such that when one or more of the auxiliary spacer members are attached to a side or end wall of the battery, the combined width or length of the auxiliary spacer members and the battery is generally equivalent to, respectively, the width or length requirement of a battery mounting device for a second vehicle having a corresponding dimensional requirement greater than the dimension of the battery. Thus, the body portions and auxiliary spacer members may be selectively attached to the battery to selectively accommodate the battery within a battery mounting device for a first vehicle having a height requirement greater than the height of the battery or within a battery mounting device for a second vehicle having a width or length requirement greater than the width and length of the battery.

It will be appreciated, therefore, that the multifunctional spacers of the present invention, because they may be employed to selectively enlarge one or more dimensions of a battery, offer substantial advantages to the SLI battery manufacturer, to the battery retailer, and to the battery user. Battery manufacturers, by using the present invention, can limit the product line required to fit the seemingly ever-increasing number of battery sizes called for in the replacement SLI battery market. The battery retailer likewise will have to carry fewer battery models, and this is important not only because it reduces the retail floor space which must be devoted to batteries, but also because it contributes to smaller inventories of batteries having faster turnover. The battery purchaser also benefits since the likelihood of finding a battery that will fit a particular vehicle is increased, and, because the retailer's inventory turns over quicker, the user is more likely to get a "fresh" battery which does not have significant stand losses.

DETAILED DESCRIPTION OF THE INVENTION

Figure 1:
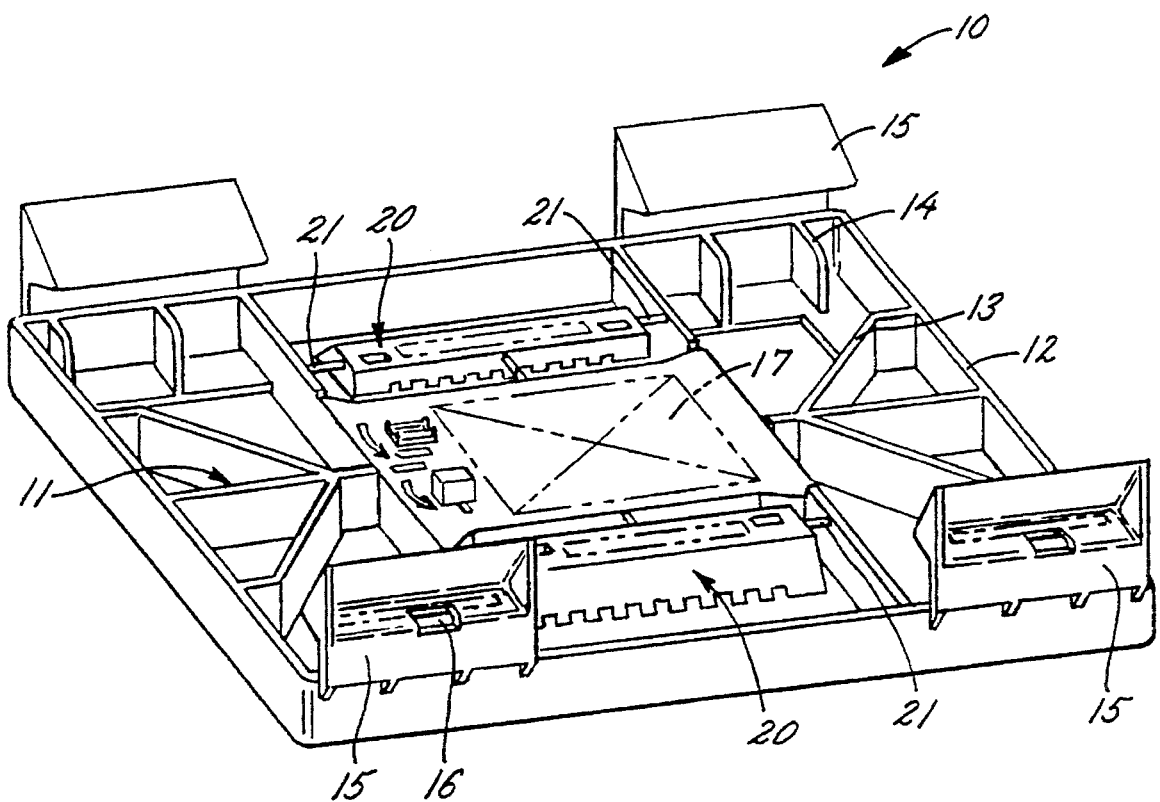
FIG. 1 is a perspective view, taken from above and to one side, of a preferred embodiment 10 of the spacers of the subject invention, showing in particular certain members 20 which may be detached from the spacer 10.
Figure 2:
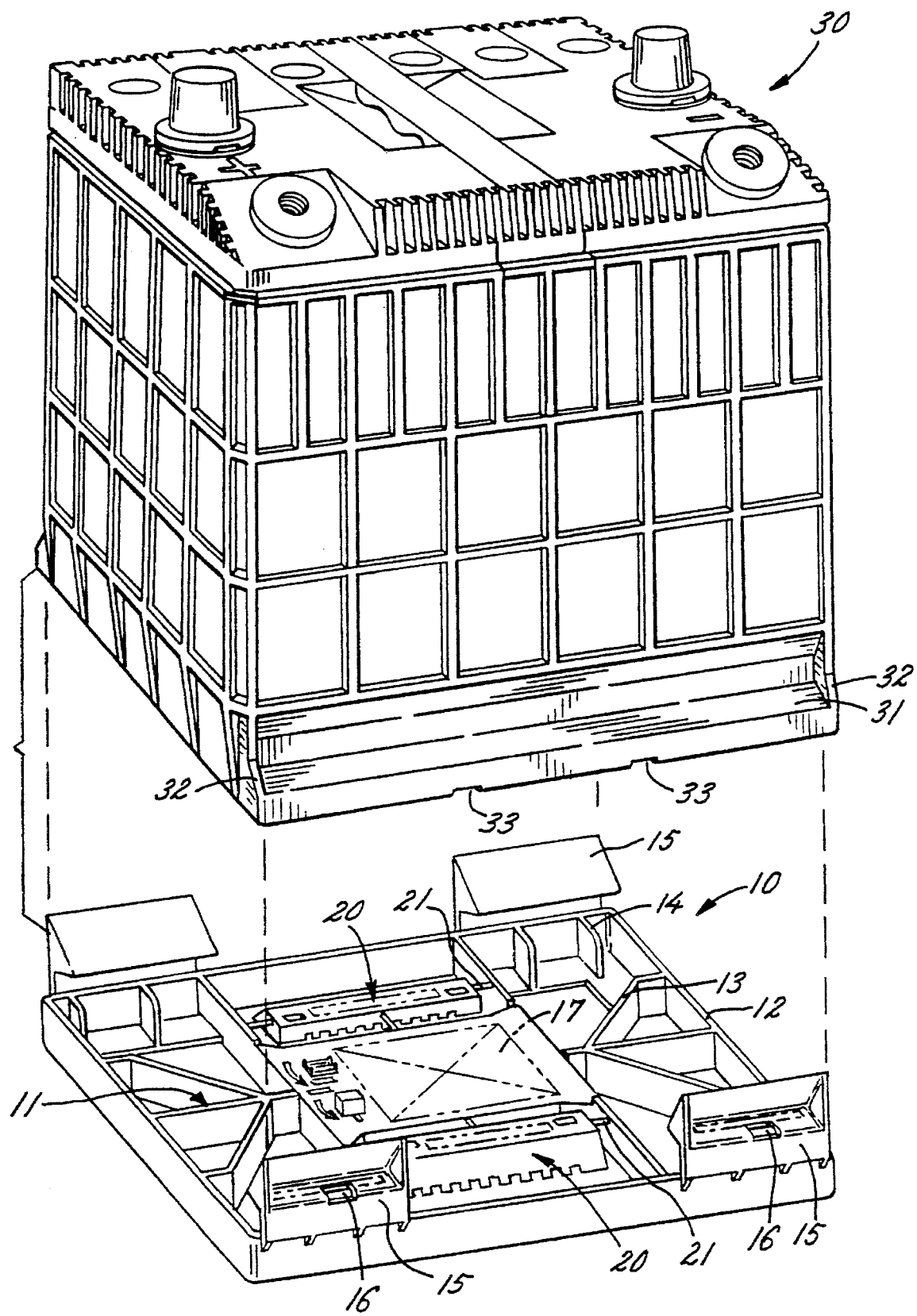
FIG. 2 is an exploded perspective view of the spacer 10 shown in FIG. 1 and a battery 30, showing in particular how the spacer may be attached to the battery 30 such that the spacer 10 functions as a height spacer.

FIG. 1 shows a preferred embodiment 10 of the spacers of the subject invention. The spacer 10 is adapted to be used in combination with a lead-acid, SLI battery, for example, the battery 30 shown in FIGS. 2–4. The battery 30 has a generally solid-rectangular shape with a top, bottom, two end, and two side walls. The battery is constructed generally as disclosed in the '386 and '725 patents, but it will be appreciated from the description which follows that the spacers of the subject invention can be used with many other lead-acid SLI batteries with little or no modification to such batteries. The battery 10 is used herein to describe the novel spacers and how they may be used, and to illustrate the benefits derived therefrom.

The multi-functional spacers of the subject invention preferably are fabricated by conventional injection molding techniques from thermoplastic materials, such as polypropylene, which are commonly employed in the manufacture of batteries. Such thermoplastic materials are easily molded, they have good structural properties, and they are chemically resistant to battery acid. It will be appreciated, however, that other materials may be employed consistent with the construction and function of the spacers as described hereinbelow.

The spacers of the subject invention comprise a body portion which is removably attachable to the bottom of a battery such that the body portion may be selectively employed as a height spacer for the battery. For example, in the illustrative spacer 10 shown in FIG. 1, the spacer body 11 includes a generally open rectangular frame 12 interconnected with a plurality of intersecting ribs 13 and gussets 14 which reinforce the frame 12. The upper edges of the frame 12, ribs 13, and gussets 14 provide a top surface on which a battery may be received. Similarly, the bottom edges of the frame 12 and ribs 13 provide a bottom surface on which the spacer 10 may be received by a tray forming part of a vehicles battery mount.

The exact configuration of the body portion 11 may be varied so long as it provides suitable top and bottom surfaces and is sufficiently rigid and durable to support the weight of a battery in service. The frame 12, with ribs 13, gussets 14, and the like, is preferred because such a design provides the spacer body 11 with a high void volume, thereby saving on material costs. The spacer body 11, however, may consist of a continuous block of material, a reinforced plate, or other configuration as will be appreciated by workers in the art.

In accordance with a preferred aspect of the subject invention, the body portion includes a continuous surface area which is visible when the spacer is handled. Preferably the continuous surface area is generally parallel to the top surface of the body portion. Instructions to a consumer as to the use of the spacer may be provided in this area.

In the illustrative spacer 10, the body portion is provided with a plate 17 for such purposes. Suitable instructions may be printed on an adhesive sticker or impressed or embossed during the molding process. If the indicia are embossed, however, the plate 17 preferably is recessed slightly relative to the top of the spacer 10 so that the top surfaces of the embossed indicia are generally coplanar with the top of the spacer 10.

The spacers of the subject invention are adapted so that the spacer body may be removably attached to the bottom of a battery so that the spacer and battery may be maintained together until installation for service. Preferably, it is removably attached in such a manner that the spacer will not become inadvertently separated from the battery during shipment or service, but can be removed with minimal effort by a user when it is not necessary to enhance the height of the battery for use with a particular vehicle battery mount.

For example, the spacer 10 is provided with four hooks 15 which releasably engage a suitable projection on a battery, for example, the enlarged feet 31 of the battery 30. Specifically, as can be appreciated by comparing FIGS. 2 and 3, the hooks 15 may be flexed outwards to allow them to clear the feet 31 of battery 30 and thereafter released so that an inner surface of the hooks 15 will engage the top surface of the feet 31 to resist downward movement and detachment of the spacer 10. Each foot 31 of the battery 30 has at each end thereof a stop 32 which can engage the sides of the spacer hooks 15 to resist sideward sliding and detachment of the spacer 10. To remove the spacer 10 from the battery 30 once it is so attached, the spacer hooks 15 can be flexed backwards allowing the hooks 15 once again to clear the feet 31 of the battery 30. A slot 16 preferably is provided in each hook 15, and a screwdriver or similar lever may be inserted into the slot 16 to facilitate bending of the hooks 15 during attachment and detachment of the spacer 10. So long as the spacer may be attached and detached with reasonable facility by a user and it will not become detached in service, however, the precise manner in which the spacer is removably attachable to a battery is not critical.

In accordance with the subject invention, the distance between the top and bottom surfaces of the spacer body is selected such that when the body portion of the spacer is attached to a battery the combined height of the body portion and battery is generally equivalent to the height of a taller battery. That is, the effective height of the battery is increased so that is may be more readily accommodated in a mounting device designed for the taller battery.

Figure 3:
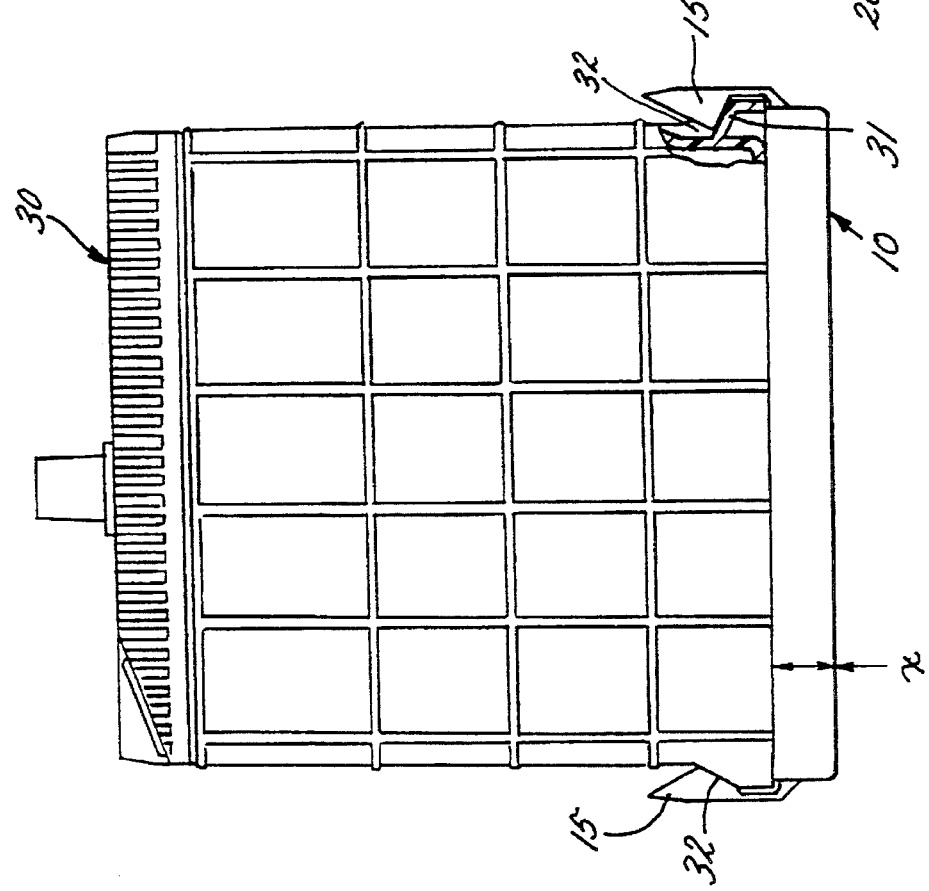
FIG. 3 is a side view, a portion thereof being shown in cross-section, of the spacer 10 and battery 30 shown in FIG. 2, showing the spacer 10 attached to the battery 30.

For example, the illustrative battery 30 is a low profile (group 34) battery having a height of approximately 7¼". The spacer 10 is adapted to facilitate the mounting of the battery 30 in vehicle mounts designed to accommodate high profile batteries with heights of approximately 8", for example, group 24, 24 H, 24 T, 24 F, and 24 R batteries. Accordingly, the distance between the top and bottom surfaces of the body portion 11, shown as dimension x in FIG. 3, is approximately ¾".

The spacer body also is preferably provided with openings designed to accommodate the top terminals of a similarly designed battery, and thereby to prevent the stacking of a plurality of batteries having the spacers attached thereto. Such openings may be provided, as in the illustrative spacer 1, by the frame 12 in the intersecting ribs 13. The exact location and configuration of such openings, of course, will be dictated by the size, shape, and arrangement of the top terminals of the battery.

In accordance with an important feature of the subject invention, the novel spacers comprise one or more auxiliary spacer members removably attached to the body portion of the spacer, preferably, in such a manner that the auxiliary spacer members will not become inadvertently separated from the spacer prior to their use, but can be detached with relative ease by a consumer when their use is desired.

For example, the spacer b0 is provided with a pair of auxiliary spacer members 20. The members 20 are attached to the spacer body 11 by sprues 21 extending between the members 20 and the spacer body 11. The sprues 21 are readily severable, e.g., by twisting the members 20, so that the members 20 may be detached from the spacer 10 by a consumer. It will be appreciated that more or fewer sprues may be provided for such purposes, however, and that severable connections other than sprues, such as thin tearable hinges, may be used to removably attach the members 20. Means also may be provided, such as hooks, clips, and the like, which permit the members 20 to be attached and reattached to the spacer 10.

In accordance with another preferred aspect of the invention, the body portion of the spacer defines one or more cavities which are adapted to accommodate the detachable members such that the detachable members, prior to their detachment from the body portion, are disposed within the cavities. The exact location and configuration of such cavities, of course, will be dictated by the size, shape, and arrangement of the detachable members of the spacer. In the illustrative spacer 10, the cavities which accommodate the detachable members 20 are defined by the frame 12 and the plurality of intersecting ribs 13. It will be appreciated, however, that such cavities may be provided in an otherwise continuous piece, e.g., by drilling or specially molding the cavities and openings.

In accordance with another feature of the subject invention, the auxiliary spacer members, when detached from the novel spacers, are attachable to a side wall of a battery, and in that manner, function as side spacers for the battery facilitating its accommodation in a mounting device designed for wider batteries.

Figure 4:
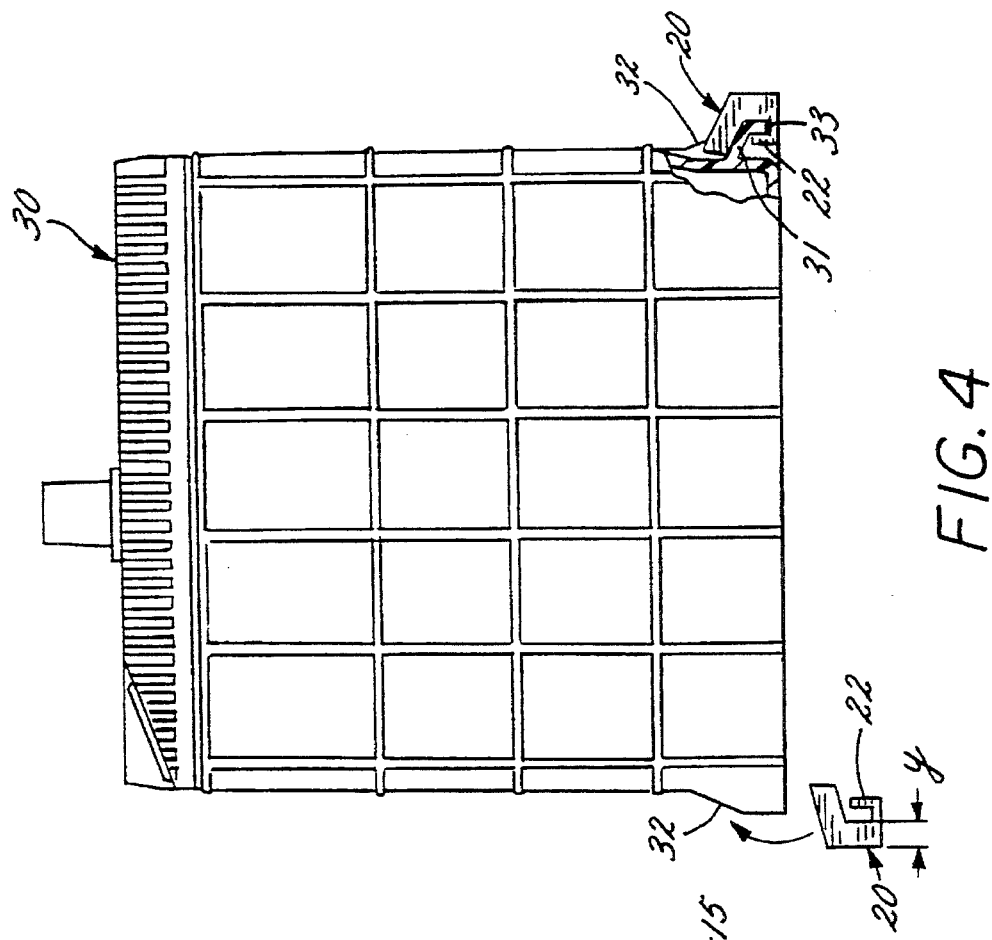
FIG. 4 is a partially exploded side view, a portion thereof being shown in cross-section, of the detachable members 20 shown in FIG. 1 and the battery 30 shown in FIG. 2, showing in particular how the detachable members 20, when detached from the spacer 10, may be attached to the battery 30 to function as width spacers for the battery 30.

For example, each member 20 is provided with a pair of projecting L-shaped tongues 22. As shown in FIG. 4, the L-shaped tongues 22 are adapted, and the member 20 itself is configured, such that the tongues 22 extend around and engage the feet 31 of the battery 30. In that manner, the members 20 are secured to the side of the battery 30 in such a fashion that they are not easily dislodged during service of the battery. Shallow recesses 33 in the feet 31 (shown in FIG. 2) are provided such that when the members 20 are attached thereto the bottom surface of the tongues 22 is flush with the bottom surface of the battery feet 31. Other means of attaching the members to the side wall of a battery, however, may be employed, as will be appreciated by workers in the art.

In most aspects, the specific configuration and dimensions of the auxiliary spacer members is not critical, unless desirable in terms of specific battery mounts, and wide variation thereof is possible. In accordance with the subject invention, however, the width of at least a portion of the auxiliary spacer members is such that when one or more of the auxiliary spacer members are attached to a side wall of the battery, a combined horizontal dimension, i.e., the combined length or combined width, of the auxiliary spacer members and the battery is generally equivalent to the same horizontal dimension of a longer or wider battery.

For example, the illustrative battery 30 is a narrow width (group 34) battery having a width of approximately 6½". The members 20 are adapted to facilitate the mounting of the battery 30 in vehicle mounts designed to accommodate a wide battery having a width of approximately 7¼", for example a group 65 battery. Accordingly, the width of the portion of the members 20 which abuts the side surface of the battery foot 31, shown in FIG. 4 as dimension y, is approximately ⅜" wide so that when both members 20 are attached to the side of the battery 30, the combined width of the two members 20 and battery 31 is 7¼".

It will be appreciated, therefore, that the spacers of the subject invention enable a single battery to be easily and readily adapted for uses with a wider range of battery mounts. If a particular battery mount is designed to accommodate batteries of the same size as the battery, the spacer may be easily removed from the battery, and the battery may be mounted in the vehicle without the spacer. On the other hand, if a vehicle battery mount is designed to accommodate taller batteries, the spacer can be left on the battery, thereby increasing its effective height, and the battery with its height so enhanced will be more readily accommodated in the battery mount. If the vehicle battery mount is designed for a wider battery, however, the spacer may be removed from the battery, and the auxiliary spacer members may be detached from the spacer and attached to the battery. The effective width of the battery will be thereby increased, and this allows the battery to be accommodated more readily in a battery mount design for wider batteries.

Thus, it will be appreciated that the benefits of separate height spacers and width spacers are obtained through the use of single spacer of the subject invention. The novel spacers may be fabricated from thermoplastic materials and injection molded as an integral piece, and thus, they may be mass produced efficiently and economically.

It will be appreciated, however, that the dimensions of the spacers and batteries described herein are provided for illustrative purposes. The dimensions of the illustrative spacer 10 can be varied to facilitate the spacer's use with other batteries of the same or different dimensions or to effectively enlarge the battery 10 to different sizes so that it may be accommodated in other mounting devices. Workers in the art can readily select suitable dimensions to optimize the physical compatibility of a battery which, in terms of its electrical performance, is suitable for use with a number of different vehicle models with mounts designed for different sizes of batteries.

This invention has been disclosed and discussed primarily in terms of specific embodiments thereof, but it is not intended to be limited thereto. For example, the auxiliary spacer members 20 and the battery 30 may be modified so that the members 20 are attached to the other two opposing sides of the battery 30, thereby providing the battery with length spacers. The auxiliary spacer members 20 also are shown as being attached to side walls of the battery 10 proximate to their lower end. Suitable engagement means may be provided on the battery 10, however, such that the members 20 may be attached near the top of the battery, and this type of configuration may be desirable for battery mounts having top hold-downs. Similarly, the battery may be adapted so that the auxiliary spacer members may be selectively attached to the top or bottom of either set of opposing side walls. Further, the dimensions of the members 20 can be coordinated such that one or both members may be selectively attached to progressively widen the battery. For example, one may be attached to a narrow battery to effectively enlarge it to the width of a standard width battery, and the second member may be attached to effectively enlarge the battery to the width of a wide battery. Other modifications and embodiments will be apparent to the worker in the art.

We claim as our invention:

1. A multi-functional spacer capable of adapting an electric storage battery having a generally solid-rectangular configuration with a top, a bottom, two end, and two sidewalls defining length, width, and height dimensions of the battery to the dimensional requirements of a battery mounting device for a first vehicle in which the height requirement is greater than the height of the battery and also capable of adapting the battery to the dimensional requirements of a battery mounting device for a second vehicle in which the length or width requirements are greater than the length and width of the battery, which spacer comprises:

a body portion removably attachable to the bottom of the battery and one or more auxiliary spacer members removably attached to the body portion and, when detached from the body portion, the auxiliary spacer members being attachable to a side or end wall of the battery;

the body portion defining a top surface adapted to receive the battery and a bottom surface adapted to be received by a battery mounting device;

the distance between the top and bottom surfaces of the body portion being coordinated such that when the body portion is attached to the battery the combined height of the body portion and battery is generally equivalent to the height requirement of a battery mounting device of a first vehicle having a height requirement greater than the height of the battery;

the width of the auxiliary spacer members being coordinated such that when one or more of the auxiliary spacer members are attached to a side or end wall of the battery, the combined width or length of the auxiliary spacer members and the battery is generally equivalent to, respectively, the width or length requirement of a battery mounting device of a second vehicle having a width or length requirement greater than the width and length of the battery;

whereby the body portion and members may be selectively attached to the battery to selectively accommodate the battery within a battery mounting device for a first vehicle having a height requirement greater than the height of the battery or within a battery mounting device for a second vehicle having a width and length requirement greater than the width and length of the battery.

2. The spacer of claim 1, wherein the spacer is a fabricated, unitary, thermoplastic, injection molded piece, the auxiliary spacer members being attached to the body portion by a thin, severable connector.

3. The spacer of claim 1, wherein the body portion defines one or more cavities adapted to accommodate the auxiliary spacer members, and the auxiliary spacer members are removably attached to the body portion such that prior to being detached from the body portion the auxiliary spacer members are disposed within the cavities.

4. The spacer of claim 1, wherein the auxiliary spacer members include a tongue adapted to releasably engage a side wall of the battery.

5. The spacer of claim 1, wherein the auxiliary spacer members are adapted for attachment to a side or end wall of the battery proximate to its top.

6. The spacer of claim 1, wherein the auxiliary spacer members are adapted to be attached to a side or end wall of the battery proximate its bottom.

7. The spacer of claim 1, wherein the auxiliary spacer members are adapted to enlarge the width of the battery.

8. The spacer of claim 1, wherein the auxiliary spacer members are adapted to enlarge the length of the battery.

9. The spacer of claim 1, wherein the battery is a standard width battery and wherein the dimensions of the auxiliary spacer members are coordinated such that when one or more of the auxiliary spacer members are attached to the battery the combined width of the auxiliary spacer members and battery is generally equivalent to the width of a wide battery.

10. The spacer of claim 1, wherein the battery is a narrow width battery and the spacer includes two auxiliary spacer members, and wherein the dimensions of the two auxiliary spacer members are coordinated such that they may be selectively attached to the battery so that the combined width of the battery and the selectively attached auxiliary spacer members is generally equivalent to the width of a standard width battery or a wide battery.

11. The spacer of claim 1, wherein the spacer includes hook members attached to the body portion to releasably engage corresponding projections in the battery.

12. The spacer of claim 1, wherein the body portion includes a frame and a plurality of ribs extending between the frame, thereby providing the body portion with a high void area.

13. The spacer of claim 1, wherein the body portion includes a continuous surface area visible when the spacer is handled for providing instructions as to the use of the spacer.

14. The spacer of claim 1, wherein the battery has top terminals and wherein the body portion of the spacer has openings adapted to receive therein the top terminals of another battery of similar design such that the batteries are stackable one on top of the other.

15. The spacer of claim 1, wherein the battery is a low profile battery and wherein the distance between the top surface and the bottom surface of the body portion is coordinated such that when the body portion is attached to the battery, the combined height of the spacer and the battery is generally equivalent to the height of a high profile battery.

16. A battery/multi-functional spacer combination comprising:

an electric storage battery having a generally solid-rectangular configuration with a top, a bottom, two end, and two sidewalls defining length, width, and height dimensions of the battery which may be selectively accommodated in a battery mounting device for a first vehicle in which the height requirement is greater than the height of the battery and in a battery mounting device for a second vehicle in which the length or width requirements are greater than the length and width of the battery; and a multi-functional spacer which comprises a body portion removably attached to the bottom of the battery and one or more auxiliary spacer members removably attached to the body portion and, when detached from the body portion, the auxiliary spacer members being attachable to a side or end wall of the battery;

the body portion defining a top surface receiving the battery and a bottom surface adapted to be received by a battery mounting device;

the distance between the top and bottom surfaces of the body portion being coordinated such that the combined height of the body portion and battery is generally equivalent to the height requirement of a battery mounting device for a first vehicle having a height requirement greater than the height of the battery;

the width of the auxiliary spacer members being coordinated such that when one or more of the auxiliary spacer members are attached to a side or end wall of the battery, the combined width or length of the auxiliary spacer members and the battery is generally equivalent to, respectively, the width or length requirement of a battery mounting device of a second vehicle having a width or length requirement greater than the width and length of the battery;

whereby the body portion and members may be selectively attached to the battery to selectively accommodate the battery within a battery mounting device for a first vehicle having a height requirement greater than the height of the battery or within a battery mounting device for a second vehicle having a width or length requirement greater than the width and length of the battery.

17. The battery/multi-functional spacer combination of claim 16, wherein the spacer is a fabricated, unitary, thermoplastic, injection molded piece, the auxiliary spacer members being attached to the body portion by a thin, severable connector.

18. The battery/multi-functional spacer combination of claim 16, wherein the spacer body portion defines one or more cavities adapted to accommodate the auxiliary spacer members, and the auxiliary spacer members are removably attached to the body portion such that prior to being detached from the body portion the auxiliary spacer members are disposed within the cavities.

19. The battery/multi-functional spacer combination of claim 16, wherein the auxiliary spacer members include a tongue adapted to releasably engage a side wall of the battery.

20. The battery/multi-functional spacer combination of claim 16, wherein the spacer body portion includes a continuous surface area visible when the spacer is handled for providing instructions as to the use of the spacer.

* * * * *